Dec. 16, 1952  T. B. TRESIDDER ET AL  2,621,383
HOSE CLAMP STRUCTURE
Filed May 20, 1948
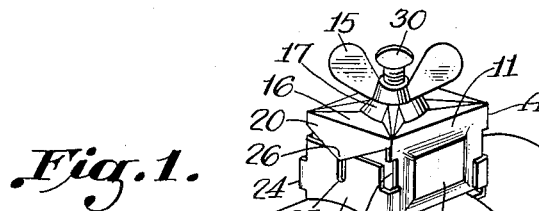
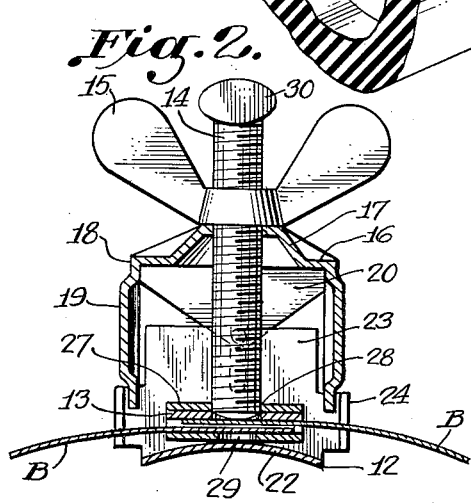
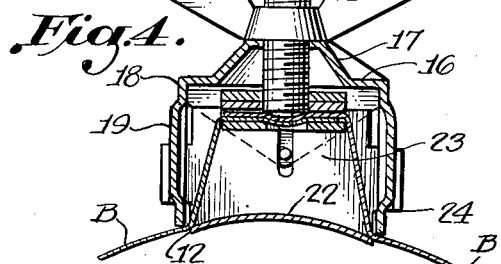
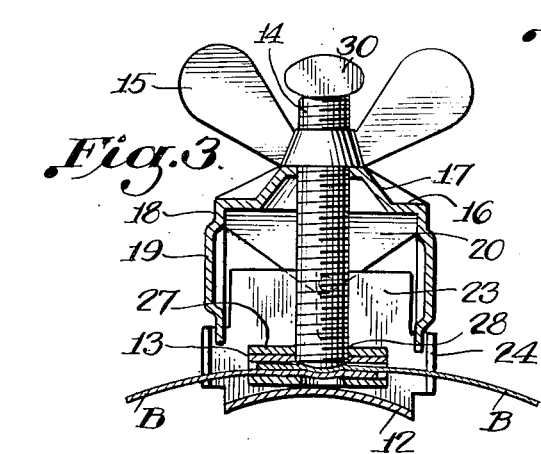
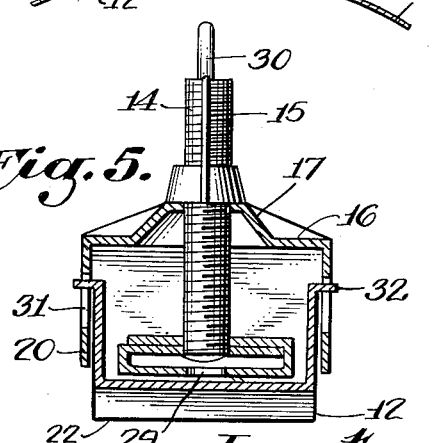
Inventors.
THOMAS BRUCE TRESIDDER.
ALAN EYNSFORD MOORE.
Oberlin & Limbach
By Attorneys.

Patented Dec. 16, 1952

2,621,383

UNITED STATES PATENT OFFICE 2,621,383

HOSE CLAMP STRUCTURE

Thomas Bruce Tresidder and Alan Eynsford Moore, Melbourne, Victoria, Australia

Application May 20, 1948, Serial No. 28,108
In Australia May 27, 1947

19 Claims. (Cl. 24—19)

This invention relates to an improved hose clip and it refers particularly to a clip adapted to be used for the purposes of tensioning a band or strap which is placed about the end portion of a flexible hose in such manner that the flexible hose will be tightly clamped about and securely fastened to a rigid pipe or connector. In this specification the term "hose clip" is used to denote the device for tensioning the strap about the hose.

Such hose clips are well known and they are used extensively in automobiles for the purpose of fastening radiator hosing to connectors on the cylinder blocks and radiators, and they are employed in aircraft for securing flexible pipes for petrol, hydraulic, pneumatic and other fluid systems or installations to the appropriate fittings. In general the method of fitment is the same for all applications; the end of the flexible hose—which is of appropriate internal diameter—is slid over the end of a connector and a flexible strap, which is used in conjunction with the hose clip, is passed about the end portion of the hose. The opposite ends of the strap are connected to the hose clip and a tensional stress is applied to the strap by the hose clip so that the strap will be strained circumferentially, thereby exerting a compressive force radially inwards on the hose to increase the frictional grip between the external surface of the connector and the internal surface of the hose. The radial force required to be applied to the hose will, of course, depend upon the internal pressure which the hose is required to withstand and/or the tensional force which may be applied to the hose.

The internal pressures of automobile radiator systems are not very high so that the principal factors to be considered in selecting a suitable hose clip are those of economy of production and convenience of installation. But, in some instances, the pressures employed in aircraft flexible pipe installations are relatively high. Moreover, in view of the safety requirements, it is necessary in aircraft installations to provide efficient connection means which will be consistent in their operation. Therefore the principal factor to be considered, in aircraft use, is that of clamping efficiency, although the factor of convenience of installation is also of importance.

It is also to be observed that, in order to ensure maximum efficiency of operation of the hose clips hitherto available for use in aircraft, it has been the practice to prohibit the repeated use of a hose clip. Thus if for any reason a hose clip and strap be removed then that clip cannot be replaced in position but must be discarded and a new clip and strap substituted. This, of course, results in a relatively high usage of clips and straps during the life of an aircraft.

This invention has been devised principally with the object of providing a hose clip which will have a high degree of efficiency in operation. An important factor in considering efficiency is the proportion of the circumference of the hose which is gripped and radially compressed by the hose clip and strap. A dependent object, therefore, is to provide a hose clip which, with the strap, will exert radial pressure upon substantially the entire circumference of a flexible hose to which it is fitted.

A further object is to devise a hose clip which will be convenient to fit in position with the flexible strap and will be readily operated so as to tightly clamp a hose end on to a connector.

A still further object is to produce a hose clip of relatively economical construction which will possess the advantage that it will not be necessary to discard the clip whenever a hose clip is removed from an aircraft flexible tube installation, it being desired to retain as much of the combined hose clip and strap as possible so that the cost of replacement of the hose clip fittings after an overhaul of an aircraft will be considerably reduced.

Yet another object is to provide a hose clip which will have a greater range of application so that the one size of hose clip may be conveniently used for a large variety of sizes of flexible hosing, thereby reducing tooling, production and servicing costs.

With these and other objects in view we have devised a hose clip which possesses the following advantages: the strap fitting about the end portion of the flexible hose is strained circumferentially by a substantially radial movement and it is held in contact with the flexible hose for a relatively large proportion of the circumference thereof; that portion of the flexible hose which is not engaged by the strap is acted upon radially by the base of the hose clip to which the opposite ends of the strap are connected; the clamping of the opposite ends of the strap and the tensioning thereof may be effected by finger pressure only; and to replace a hose clip fitting after use it is merely necessary to substitute a new strap for that discarded, the hose clip being retained.

The hose clip provided by our invention comprises a housing and a clamp associated with the housing, the clamp being adapted to securely fasten together the opposite ends of a flexible metal band or strap. The clamp is connected to the housing by a screw in such manner that when the screw is operated to tension the strap there is caused a relative movement between the clamp and the housing so that the clamp moves substantially radially outwards relative to side members of the housing. Thereupon the opposite ends of the strap are drawn outwardly to tension the strap, the end portions of the strap moving slidably about the inner edges of the side members of the housing and being held thereby firmly in contact with the outer surface of the flexible hose. Simultaneously, a portion of the housing is pressed radially inwards to act upon that portion of the hose which is not gripped by the strap.

In order that the invention will be clearly understood and the advantages thereof fully appreciated reference will now be made to the accompanying sheet of illustrative drawings which depict an exemplary form of hose clip constructed according to this invention, and a minor modification thereof. In these drawings:

Fig. 1 shows a hose clip, constructed according to our invention, associated with a flexible strap and fitted on to a flexible hose so as to clamp it on to a connector, Fig. 2 is a transverse section of the hose clip assembly in initial position prior to the clamping of the opposite ends of the strap.

Figs. 3 is a section, similar to Fig. 2, but with the ends of the strap securely held in the clip.

Fig. 4 shows the hose clip in transverse section, the clip being drawn upwardly to tension the strap.

Fig. 5 illustrates, in longitudinal section, a slightly modified form of the invention.

Referring initially to the construction illustrated in and by Figs. 1 to 4, the hose clip fitting consists of the combination of a hose clip, indicated in Fig. 1 by the letter A, and a strap B. The strap fits tightly about a hose C which is to be secured to a connector D.

The hose clip A, which constitutes the principal part of this invention, consists of a housing 11, a base 12, a cage 13, a screw 14 and a wing-nut 15. The housing 11 has a top plate 16 embossed and ribbed at 17 and formed with a central hole, two rectangular-shaped sides 18 embossed at 19, and two ends 20 of broadly V shape. The opposite edges of the sides 18 are cut away at 21.

The base 12 comprises an arcuately curved base plate 22 formed with two upwardly extending ends 23. Each of these ends has, near its inner end, two oppositely positioned inturned lugs 24, and, in its outer end portion, a narrow slot 25. The housing 11 and base 12 are adapted to interfit, with the ends 23 of the base 12 sliding between the ends 20 of the housing 11 and the lugs 24 of the base fitting slidably about the cutaway edges 21 of the housing sides 18. The ends 20 of the housing 11 are formed at 26 with inward projections which engage in the slots 25 of the base 12 and limit the relative movement of the housing 11 and base 12.

By reason of the interlocking design of these two parts the composite structure is extremely strong. Thus, the lugs 24 fitting about the opposite edges of the sides 18 restrain those sides against outward movement under the tension of the strap 8. The sides 18 are further strengthened by the embossments 19.

Located within the parts 11 and 12 is the cage 13. This cage is of substantially rectangular shape and it is formed by folding a length of metal so that its opposite ends project upwardly and then inwardly to form an open rectangular box or cage. For purposes of strength the opposite ends are folded so as to overlap. The overlapping ends 27 are drilled and tapped at 28 to constitute a nut and the underneath portion or base of the cage is drilled at 29 axially with the tapped hole 28. The screw 14 is fitted through the central hole in the embossed top 16 of the housing 11 so as to engage in the tapped hole 28 of the cage 13, the wing nut 15 being first engaged on the screw 14 so that it is adapted to bear on the embossment 17. The outer end of the screw 14 is flattened at 30 to form a large head capable of being conveniently gripped by the fingers. The inner end of the screw 14 is rounded slightly so that it is adapted to press the metal of the strap B into the drilled hole 29.

In order to engage the ends of the strap B in the clamp formed by the cage 13 and screw 14 the screw is loosened until there is sufficient clearance between the inner end of the screw 14 and the base of the cage 13. The opposite ends of the strap B are then inserted between the lower ends of the sides 18 and the base plate 22 so as to project into and through the cage 13—see Fig. 2. The screw 14 is then turned so that it presses on the end portions of the strap B, and, by further rotation, forms indentations in the strap by forcing the material thereof into the hole 29 which is formed in the base of the cage 13. The ends of the strap B will then be firmly gripped in the cage 13 by the screw 14—see Fig. 3. It is to be noted that the material of the strap B is not perforated or cut, so that its maximum strength is retained.

The strap B may be tensioned by turning the wing nut 15 so that the screw 14 is drawn outwardly of the housing 11. With the initial rotation of the wing nut 15 the housing 11 is pressed downwardly relative to the cage 13, due to the relative ease with which the strap B is bent. After a short movement the cage 13 will commence to move radially outwards as the housing 11 moves inwardly, the forces acting on the two parts tending to balance, and then as the strap B is further tensioned—if the housing 11 has reached the limit of its inward movement—the cage 13 will be drawn outwardly, pulling the end portions of the strap B beneath the sides 18 of the housing 11—see Fig. 4.

As the tensional stress of the strap B increases it compresses the material of the flexible hose C and, acting together with the inward pressure of the base 12, increases the pressure with which the connector D is gripped, with the result that the frictional loading to prevent escape of fluid and/or to restrain the hose C from becoming disconnected from the connector D is gradually increased until it is sufficient to withstand the internal pressures of the tube C and/or the tensional stresses tending to pull the tube C from the connector D.

According to the modification depicted in Fig. 5 the ends 20 of the housing 11 are slotted at 31 and the upper or outer extremities of the ends 23 of the base 12 are formed as outwardly projecting tongues 32 adapted to engage slidably in the slots 31. Thus the slot-and-pin connection of the construction illustrated in Figs. 1 to 4 is reversed. The construction shown in Fig. 5 is, in other respects, similar to that shown in Figs. 1 to 4. In this view the folded construction of the cage 13 is clearly illustrated.

By reason of the fact that the strap B may be readily cut to any convenient length from a roll of suitable material, and as the curvature of the base plate 22 is selected to correspond with diameter of flexible hose approximately the mean of the hosings to which the hose clip may be applied, it will be found that the one size of hose clip A may be conveniently and efficiently used for a very large range of diameters of flexible hosing. The parts of the hose clip A are so designed that the tensioning movements of the several parts are sufficient to apply a loading suitable for the range selected and to withstand the desired internal working pressures customarily applied to hoses within that range.

The hose clip A is of very sturdy, compact construction and the parts are relatively economical to manufacture. The strap B is made of a metal having desired properties of tensile strength, flexibility and hardness and it may be cut to the desired width from sheets of suitable material. The housing 11, base 12, and cage 13, of the hose clip A may all be conveniently formed by metal pressing operations.

What we do claim is:

1. A hose clamp structure comprising a strap adapted to encircle a hose, a clamping device including an operating screw clamping the end portions of said strap together in circumferentially lapped relation, a housing provided with a base which is adapted to press upon the surface of the hose underneath said clamping device, said clamping device being outwardly movably associated with said housing whereby said strap may be tensioned, and means having threaded engagement with said screw and bearing on said housing for drawing said clamping device and the strap end portions clamped together thereby outwardly with respect to said housing, said housing being formed with side walls to bear against and to retain the portions of said strap at opposite sides of said base against the hose which said strap is adapted to encircle.

2. A hose clamp structure according to claim 1 wherein said housing has openings formed under its opposite side walls so that the end portions of said strap may be passed through such openings for clamping in said clamping device.

3. A hose clamp structure according to claim 1 wherein said clamping device consists of a cage to receive the end portions of said strap and said screw is in threaded engagement with said cage for clamping together the end portions of said strap.

4. A hose clamp structure according to claim 3 wherein said screw and a nut threaded thereon and bearing on said housing constitute said means for drawing said clamping device outwardly with respect to said housing.

5. A hose clamp structure according to claim 4 wherein said cage has upper and lower sides between which the lapped end portions of said strap are disposed, the upper side being formed with a threaded hole therethrough for said screw, and the lower side being formed with an opening in alignment with such threaded hole whereupon turning of said screw causes the end thereof to form indentations in the lapped portions of said strap.

6. A hose clamp structure comprising a strap adapted to encircle a hose, a clamping device including an operating screw clamping together in circumferentially lapped relation the end portions of said strap, a tensioning device including a housing member embracing the lapped portions of said strap and a base member connected to said housing member, said base member being disposed underneath the lapped end portions of said strap, said members forming therebetween and at opposite sides openings to receive the lapped end portions of said strap, and a nut threadedly connected to the screw of said clamping device and bearing on said housing member to draw said clamping device and the lapped end portions of said strap clamped together thereby with respect to said housing and base members and thus to tension said strap about a hose 7. A hose clamp structure according to claim 6 wherein one of said housing and base members is formed with lugs engaging the sides of the other one of said members to resist spreading apart of the opposite sides of said housing member under the tension of said strap.

8. A hose clamp structure according to claim 7 wherein said lugs are formed near the inner end portions of the opposite sides of said base member and are inturned to fit about the edge portions of the sides of said housing member.

9. A hose clamp structure according to claim 6 wherein the housing member has a projection formed on each of its opposite end walls and the base member has a vertical slot formed in each of its opposite end walls at such a location that the projections of the housing member are adapted to fit slidably within the slots of the base member.

10. A hose clamp structure according to claim 6 wherein the base member has a projection formed on each of its opposite end walls and the housing member has a vertical slot formed in each of its opposite end walls at such a location that the projections of the base member are adapted to fit slidably within the slots of the housing member.

11. A hose clamp structure according to claim 6 wherein said screw extends through a hole in said housing member, and said nut is threaded onto said screw and bears on said housing member.

12. A hose clamp structure according to claim 11 wherein said screw is threaded into a hole formed in said clamping device and presses upon and clamps the lapped end portions of said strap together.

13. A hose clamp structure according to claim 12 wherein said clamping device comprises a cage formed with a screw-threaded hole in its upper surface for said screw and a coaxial hole in its lower surface whereby indentations are formed in the lapped end portions of said strap to securely clamp such portions in said cage.

14. A hose clamp structure according to claim 13 wherein said nut is threaded onto the outer end of said screw to bear against the top of said housing member whereby upon rotation of said nut, said screw and thus said cage with the lapped end portions of said strap clamped therein are drawn outwardly relative to said housing member.

15. A hose clamp structure for tensioning a flexible strap about a hose comprising a clamping device and a tensioning device; said clamping device consisting of a screw and a clamping member threadedly engaged with said screw and formed to receive the end portions of a strap in overlapped relation for clamping together between said screw and clamping member, said tensioning device consisting of a housing member having a hole through the top through which said screw extends and opposite depending side walls straddling said clamping member, a base member having a base plate underneath said clamping member and opposed upstanding walls, each of which is formed with a lug at each of its opposite sides to embrace, and thus preclude transverse spreading apart of the side walls of said housing member, and means threadedly engaged with said screw and bearing on the top of said housing member for drawing said clamping device toward the top of said housing member and away from said base plate.

16. A hose clamp structure according to claim 15 wherein said screw is formed with a fingerpiece at its outer end and said means comprises a wing nut, the hole in the top of the housing member being unthreaded for permitting drawing of said screw as aforesaid.

17. A hose clamp structure according to claim 16 wherein said base plate is curved arcuately to fit around a portion of the periphery of the hose.

18. A hose clamp structure according to claim 15 wherein the clamping member comprises a cage formed with end walls and upper and lower surfaces, the opposite sides being open to permit the fitting of the ends of a flexible strap into the cage, a screw-threaded hole being formed in the upper surface of the cage and a hole being formed in the lower surface of the cage in axial alignment with the first-mentioned hole, the screw being engaged in the screw-threaded hole in said cage.

19. Strap end gripping and tensioning means comprising a clamp device including an operating screw and adapted to engage the grip opposed overlapping strap end portions, and a housing for said clamp provided with a top wall through which said screw extends and with opposed side walls adapted to engage the strap portions to each side of the clamped overlapping end portions, and a nut bearing against such top wall of said housing and threadedly engaging said screw whereby said clamp device and the clamped overlapped end portions of the strap may be drawn into said housing toward such top wall thereof.

THOMAS BRUCE TRESIDDER.
ALAN EYNSFORD MOORE.

REFERENCES CITED

The following references are of record in the file of this patent:

UNITED STATES PATENTS

| Number | Name | Date |
| --- | --- | --- |
| 1,053,684 | Vogel | Feb. 18, 1913 |
| 1,412,187 | Lopdell | Apr. 11, 1922 |
| 1,412,189 | Lopdell | Apr. 11, 1922 |
| 1,413,003 | Chaloupka | Apr. 18, 1922 |
| 1,952,863 | Hueber | Mar. 27, 1934 |
| 2,183,175 | Tetzlaff | Dec. 12, 1939 |
| 2,370,766 | Austin | Mar. 6, 1945 |

FOREIGN PATENTS

| Number | Country | Date |
| --- | --- | --- |
| 337,002 | Germany | May 23, 1921 |
| 234,639 | Switzerland | Feb. 1, 1945 |